US012320911B2

(12) United States Patent
Chiu et al.

(10) Patent No.: US 12,320,911 B2
(45) Date of Patent: Jun. 3, 2025

(54) RANGING-AIDED ROBOT NAVIGATION USING RANGING NODES AT UNKNOWN LOCATIONS

(71) Applicant: SRI International, Menlo Park, CA (US)

(72) Inventors: Han-Pang Chiu, West Windsor, NJ (US); Abhinav Rajvanshi, Plainsboro, NJ (US); Alex Krasner, Princeton, NJ (US); Mikhail Sizintsev, Princeton, NJ (US); Glenn A. Murray, Jamison, PA (US); Supun Samarasekera, Skillman, NJ (US)

(73) Assignee: SRI International, Menlo Park, CA (US)

( * ) Notice: Subject to any disclaimer, the term of this patent is extended or adjusted under 35 U.S.C. 154(b) by 379 days.

(21) Appl. No.: 17/695,784

(22) Filed: Mar. 15, 2022

(65) Prior Publication Data
US 2022/0299592 A1    Sep. 22, 2022

Related U.S. Application Data

(60) Provisional application No. 63/161,870, filed on Mar. 16, 2021.

(51) Int. Cl.
*G01S 5/02*    (2010.01)
*G01S 5/00*    (2006.01)
(Continued)

(52) U.S. Cl.
CPC .......... *G01S 5/0268* (2013.01); *G01S 5/0036* (2013.01); *G01S 13/426* (2013.01); *G01S 13/865* (2013.01)

(58) Field of Classification Search
None
See application file for complete search history.

(56) References Cited

U.S. PATENT DOCUMENTS 5,101,356 A * 3/1992 Timothy ................. G01S 19/54
701/470
5,790,071 A * 8/1998 Silverstein ........... H04B 7/2041
342/372

(Continued)

OTHER PUBLICATIONS

E. Mazomenos, J. Reeve, and N. White, "An accurate range-only tracking system using wireless sensor networks," in Eurosensors Conference, 2009.

(Continued)

*Primary Examiner* — Bernarr E Gregory
(74) *Attorney, Agent, or Firm* — MOSER TABOADA

(57) ABSTRACT

A method, apparatus and system for determining change in pose of a mobile device include determining from first ranging information received at a first and a second receiver on the mobile device from a stationary node during a first time instance, a distance from the stationary node to the first receiver and the second receiver, determining from second ranging information received at the first receiver and the second receiver from the stationary node during a second time instance, a distance from the stationary node to the first receiver and second receiver, and determining from the determined distances during the first time instance and the second time instance, how far and in which direction the first receiver and the second receiver moved between the first time instance and the second time instance to determine a change in pose of the mobile device, where a position of the stationary node is unknown.

23 Claims, 8 Drawing Sheets

(51) Int. Cl.
*G01S 13/42* (2006.01)
*G01S 13/86* (2006.01)

(56) References Cited

U.S. PATENT DOCUMENTS

| | | | | |
|---|---|---|---|---|
| 5,995,023 | A * | 11/1999 | Kreft | G01C 21/30 |
| | | | | 701/445 |
| 6,288,671 | B1 * | 9/2001 | Wu | G01S 5/0247 |
| | | | | 701/13 |
| 6,504,502 | B1 * | 1/2003 | Wu | B64G 1/244 |
| | | | | 342/359 |
| 6,710,719 | B1 * | 3/2004 | Jones | G01S 5/14 |
| | | | | 340/10.2 |
| 11,277,200 | B2 * | 3/2022 | Oster | H04B 7/18519 |
| 2002/0140606 | A1 * | 10/2002 | Davis | G01S 5/0247 |
| | | | | 342/442 |
| 2015/0228077 | A1 * | 8/2015 | Menashe | G01S 5/163 |
| | | | | 382/103 |

OTHER PUBLICATIONS

T. Nguyen, T. Nguyen, and L. Xie, "Tightly-coupled single-anchor ultra-wideband-aided monocular visual odometry system," in IEEE International Conference on Robotics and Automation (ICRA). IEEE, 2009.

Kitt, et al., "Visual odometry based on stereo image sequences with ransac-based outlier rejection scheme," in IEEE Intelligent Vehicles Symposium (IV). IEEE, 2010.

T. Oskiper, H. Chiu, Z. Zhu, S. Samaresekera, and R. Kumar, "Multi-modal sensor fusion algorithm for ubiquitous infrastructure-free localization in vision-impaired environments," in IEEE International Conference on Intelligent Robots and Systems (IROS). IEEE, 2010.

D. Scaramuzza and F. Fraundorfer, "Visual odometry: part i: the first 30 years and fundamentals," IEEE robotics and automation magazine, vol. 18, No. 4, pp. 80-92, 2011.

H.-P. Chiu, S. Williams, F. Dellaert, S. Samarasekera, and R. Kumar, "Robust vision-aided navigation using sliding-window factor graphs," in IEEE International Conference on Robotics and Automation (ICRA). IEEE, 2013, pp. 46-53.

C. Forster, M. Pizzoli, and D. Scaramuzza, "Svo: fast semi-direct monocular visual odometry," in IEEE International Conference on Robotics and Automation (ICRA). IEEE, 2014.

A. Shariati, K. Mohta, and C. Taylor, "Recovering relative orientation and scale from visual odometry and ranging radio measurements," in IEEE/RSJ International Conference on Intelligent Robots and Systems (IROS). IEEE, 2016.

F. Dellaert and M. Kaess, "Factor graphs for robot perception," Foundations and Trends in Robotics, vol. 6, No. 1, pp. 1-139, 2017.

F. Perez-Grau, F. Caballero, L. Merino, and A. Viguria, "Multi-modal mapping and localization of unmanned aerial robots based on ultrawideband and rgb-d sensing," in IEEE/RSJ International Conference on Intelligent Robots and Systems (IROS). IEEE, 2017.

W. Chen, H. Zhang, T. Nguyen, and L. Xie, "Ultra-wideband aided fast localization and mapping system," in IEEE International Conference on Intelligent Robots and Systems (IROS). IEEE, 2017.

J. Tiemann, A. Ramsey, and C. Wietfeld, "Enhanced uav indoor navigation through slam-augmented uwb localization," in IEEE International Conference on Communications Workshops (ICC Workshops). IEEE, 2018.

T. Nguyen, A. Zaini, C. Wang, K. Guo, and L. Xie, "Robust target-relative localization with ultra-wideband ranging and communication," in IEEE International Conference on Robotics and Automation (ICRA). IEEE, 2018.

Y. Song, M. Guan, W. Tay, C. Law, and C. Wen, "Uwb/lidar fusion for cooperative range-only slam," in IEEE International Conference on Robotics and Automation (ICRA). IEEE, 2019.

J. Queralta, C. Almansa, F. Schiano, D. Floreano, and T. Westerlund, "Uwb-based system for uav localization in gnss-denied environments: Characterization and dataset," arXiv preprint arXiv:2003.04380, 2020.

S. Wang, C. Almansa, J. Queralta, Z. Zou, and T. Westerlund, "Uwb-based localization for multi-uav systems and collaborative heterogeneous multi-robot systems: a survey," arXiv preprint arXiv:2004.08174, 2020.

* cited by examiner

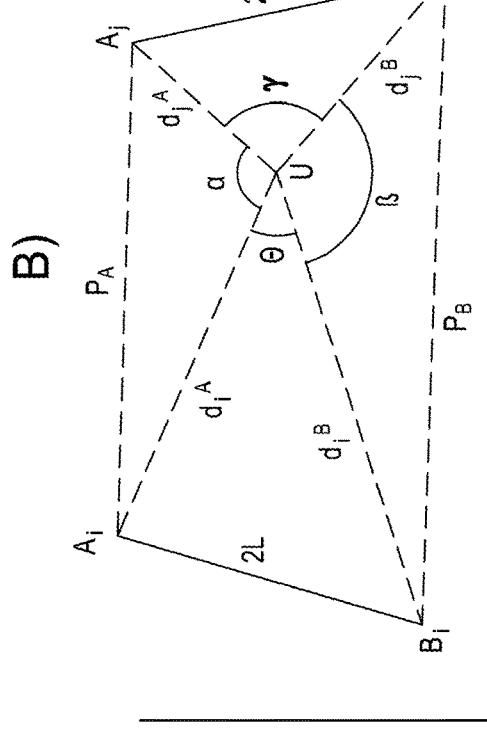
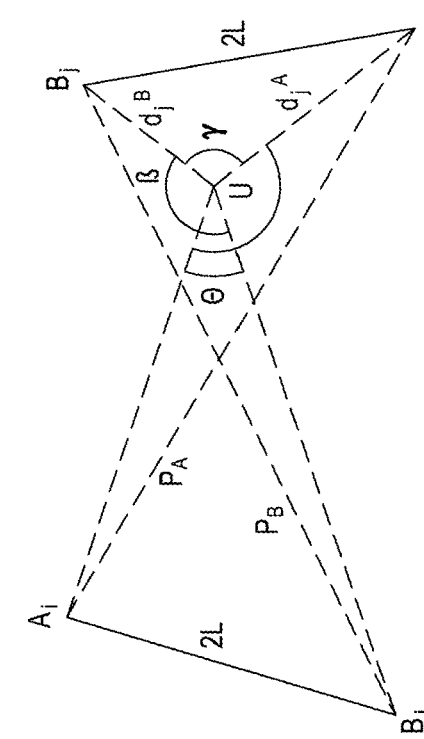
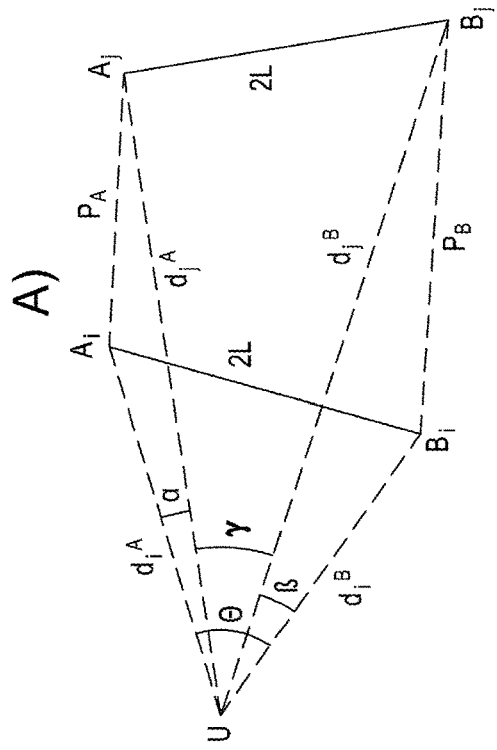
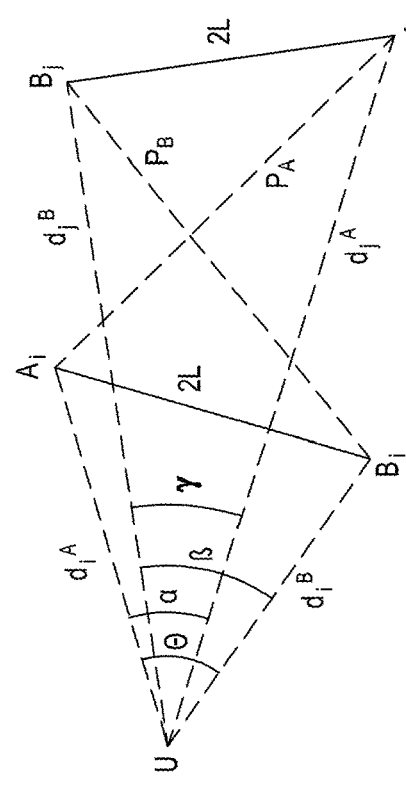
FIG. 3

| Scenario | (1) 4 L-shape loops 176.8 meters | (2) 5 rectangle loops 193.3 meters | (3) 4 straight-line loops 98.2 meters | (4) 2 L-shape loops 93.5 meters | (5) 1 straight-line loop 21.8 meters |
|---|---|---|---|---|---|
| No Ranging (baseline) | 0.248 / 0.257 | 0.569 / 0.655 | 0.326 / 0.333 | 0.420 / 0.679 | 0.279 / 0.327 |
| Traditional Method | 0.243 / 0.254 | 0.262 / 0.267 | 0.159 / 0.164 | 0.327 / 0.628 | 0.119 / 0.150 |
| Improvement | 2.02% / 1.17% | 53.95% / 59.24% | 51.23% / 50.75% | 22.14% / 7.51% | 57.35% / 54.13% |
| Our Method | 0.131 / 0.140 | 0.199 / 0.203 | 0.146 / 0.150 | 0.233 / 0.610 | 0.169 / 0.229 |
| Improvement | 47.17% / 45.53% | 65.03% / 69.00% | 55.21% / 54.95% | 44.52% / 10.16% | 39.43% / 29.97% |

FIG. 4

| Scenario | (1) 4 L-shape loops 176.8 meters | (2) 5 rectangle loops 193.3 meters | (3) 4 straight-line loops 98.2 meters | (4) 2 L-shape loops 93.5 meters | (5) 1 straight-line loop 21.8 meters |
|---|---|---|---|---|---|
| No Ranging (baseline) | 0.106 / .0106 | 0.128 / 0.130 | 0.246 / 0.270 | 0.373 / 1.013 | 0.639 / 0.739 |
| Traditional Method | 0.088 / 0.133 | 0.113 / 0.119 | 0.023 / 0.023 | 0.152 / 0.926 | 0.336 / 0.396 |
| Improvement | 16.98% / -25.47% | 11.72% / 8.46% | 90.65% / 91.48% | 59.25% / 8.59% | 47.42% / 46.41% |
| Our Method | 0.083 / 0.083 | 0.072 / 0.073 | 0.056 / 0.056 | 0.131 / 0.983 | 0.037 / 0.301 |
| Improvement | 21.70% / 21.70% | 43.75% / 43.85% | 77.24% / 79.26% | 64.88% / 2.96% | 94.21% / 59.27% |

FIG. 5

| Scenario | Scenario 1: 225.6 meters | | Scenario 2: 152.8 meters | |
|---|---|---|---|---|
| | 2D/3D RMS Error (meter) | 2D/3D Closure Error (meter) | 2D/3D RMS Error (meter) | 2D/3D Closure Error (meter) |
| Without Radio | 2.850 / 2.912 | 0.823 / 1.247 | 0.908 / 0.986 | 0.779 / 0.781 |
| With Radio | 0.613 / 0.804 | 0.416 / 0.946 | 0.447 / 0.484 | 0.130 / 0.130 |
| Improvement | 78.49% / 72.39% | 49.45% / 24.14% | 50.77% / 50.91% | 83.31% / 83.35% |

FIG. 6

RANGING-AIDED ROBOT NAVIGATION USING RANGING NODES AT UNKNOWN LOCATIONS

CROSS-REFERENCE TO RELATED APPLICATIONS

This application claims benefit of and priority to U.S. Provisional Patent Application Ser. No. 63/161,870, filed Mar. 16, 2021, which is herein incorporated by reference in its entirety.

GOVERNMENT RIGHTS

This invention was made with Government support under Contract Number W9132V19C0003 awarded by the Engineering Research and Development Center (ERDC)-Geospacial Research Lab (GRL). The Government has certain rights in this invention.

FIELD

Embodiments of the present principles generally relate to a method, apparatus and system for determining a change in pose of a mobile device using ranging nodes having unknown locations and, more particularly, to a method, apparatus and system for determining a change in pose of a mobile device using ranging nodes having unknown locations for augmenting navigation information.

BACKGROUND

Accurate navigation is a fundamental capability required for autonomous mobile devices in GPS-denied environments. In the absence of GPS signals, mobile devices typically rely on onboard sensors to compute odometry as they navigate through environments. However, costly and bulky sensors (such as LiDAR) are not attractive for industrial applications. Furthermore, the performance of popular, low-cost sensors (such as cameras) degrades in challenging environments, such as dark and/or occluded environments.

Recent approaches for navigating challenging environments include utilizing ranging, wireless beacons and paired ranging radios placed in the challenging environments. Such approaches are robust to visually degraded environments, such as dark, dusty or smoky environments. However, ranging-based methods for navigation of mobile devices demand that the locations of the ranging devices to be known. The positions of ranging beacons are typically calculated by a careful setup and calibration process in the environment of operation before the mobile devices are able to leverage ranging measurements for navigation. Pre-setup and measurement of the ranging beacons is not feasible for time-pressed applications, such as indoor search and rescue missions. The pre-setup and measurement of ranging beacons may also be unrealistic in dynamic and cluttered environments such as warehouses.

SUMMARY

Embodiments of methods, apparatuses and systems for determining a change in pose of a mobile device using ranging nodes having unknown locations for, in some embodiments, augmenting navigation information are disclosed herein.

In some embodiments, a method for determining a change in pose of a mobile device includes receiving first data representative of a first ranging information received at a first receiver located at a first position on the mobile device and received on a second receiver located at a second position on the mobile device from a stationary node during a first time instance, wherein a position of the stationary node is unknown, receiving second data representative of a second ranging information received at the first receiver and on the second receiver from the stationary node during a second time instance, and determining, from the first representative data and the second representative data, a change in pose of the mobile device from the first time instance to the second time instance.

In some embodiments, in the method the determining a change in pose of the mobile device includes determining a distance from the stationary node to the first receiver and to the second receiver during the first time instance using the first ranging information, determining a distance from the stationary node to the first receiver and to the second receiver during the second time instance using the second ranging information, and determining how far and in which direction the first receiver and the second receiver moved between the first time instance and the second time instance to determine a change in pose of the mobile device from the first time instance to the second time instance.

In some embodiments, the determined change in pose of the mobile device is implemented to assist in a navigation of the mobile device through an environment to be navigated.

In some embodiments, the first representative data of the method further includes data representative of the first ranging information received at the first time instance on at least a third receiver located on at least a third position on the mobile device from a stationary node, and the second representative data further includes data representative of the second ranging information received at the second time instance on the at least third receiver from the stationary node.

In some embodiments, in the method the first ranging information and the second ranging information received on at least one of the first receiver, the second receiver and the at least third receiver are implemented to determine a three-dimensional change in pose of the mobile device from the first time instance to the second time instance.

In some embodiments, the method further includes receiving at least a third data representative of at least a third ranging information received at the first receiver and the second receiver from the stationary node during at least a third time instance, wherein the determining a change in pose includes determining, from the first representative data, the second representative data, and the at least third representative data a change in pose of the mobile device between at least two of the first time instance, the second time instance and the third time instance.

In some embodiments in accordance with the present principles, a non-transitory machine-readable medium has stored thereon at least one program, the at least one program including instructions which, when executed by a processor, cause the processor to perform a method in a processor based system for determining a change in pose of a mobile device including determining from received first data representative of a first ranging information received at a first receiver located at a first position on the mobile device and received on a second receiver located at a second position on the mobile device from a stationary node during a first time instance, a distance from the stationary node to the first receiver and to the second receiver during the first time instance, wherein a position of the stationary node is unknown, determining from received second data representative of a second ranging information received at the first receiver and at the second receiver from the stationary node during a second time instance a distance from the stationary node to the first receiver and to the second receiver during the second time instance, and determining from information regarding the determined distance from the stationary node to the first receiver and to the second receiver during the first time instance and information regarding the determined distance from the stationary node to the first receiver and to the second receiver during the second time instance how far and in which direction the first receiver and the second receiver moved between the first time instance and the second time instance to determine a change in pose of the mobile device from the first time instance to the second time instance.

In some embodiments, a system for determining a change in pose of a mobile device includes at least one stationary node transmitting ranging signals during at least two time instances, wherein a position of the stationary node in the environment to be navigated is unknown. In some embodiments, the mobile device includes at least two receivers located at different locations on the mobile device receiving the ranging signals from the stationary node during the at least two time instances, and a computing device including a processor and a memory having stored therein at least one program. In some embodiments, the at least one program includes instructions which, when executed by the processor, cause the processor to perform a method for determining a change in pose of a mobile device in an environment to be navigated, including receiving first data representative of a first ranging information received at a first receiver of the at least two receivers located at a first position on the mobile device and received at a second receiver of the at least two receivers located at a second position on the mobile device from the stationary node during a first time instance of the at least two time instances, wherein a position of the stationary node is unknown, receiving second data representative of a second ranging information received at the first receiver and at the second receiver from the stationary node during a second time instance of the at least two time instances, and determining, from the first representative data and the second representative data, a change in pose of the mobile device from the first time instance to the second time instance.

In some embodiments of the system, the mobile device further includes at least position sensors for determining information for navigation of the mobile device through an environment to be navigated and the method further includes implementing the determined change in pose of the mobile device to assist in the navigation of the mobile device through the environment to be navigated.

In some embodiments of the system, determining a change in pose of the mobile device of the method includes determining a distance from the stationary node to the first receiver and to the second receiver at the first time instance using the first ranging information, determining a distance from the stationary node to the first receiver and to the second receiver at the second time instance using the second ranging information, and determining how far and in which direction the first receiver and the second receiver moved between the first time instance and the second time instance to determine a change in pose of the mobile device from the first time instance to the second time instance.

In some embodiments of the system, the representative data received during the first time instance further comprises data representative of the first radio signal received at the first time instance on at least a third receiver located on at least a third position on the mobile device from the stationary node, and the representative data received during the second time instance further comprises data representative of the second ranging information received at the second time instance on the at least third receiver from the stationary node.

In some embodiments of the system, the at least third receiver is located on a different plane than the first receiver and the second receiver.

In some embodiments of the system, the first ranging information and the second ranging information received on at least one of the first receiver, the second receiver and the at least third receiver are implemented to determine a three-dimensional change in pose of the mobile device from the first time instance to the second time instance.

In some embodiments of the system, the method further includes receiving at least data representative of at least a third radio signal received on at least a third time instance on the first receiver and on the second receiver from the stationary node, where the determining a change in pose of the mobile device includes determining, from the first representative data, the second representative data, and the at least third representative data, a change in pose of the mobile device.

In some embodiments of the system, at least one of the first receiver and the second receiver includes a radio antenna, the stationary node includes a ranging radio node, and the mobile device includes a robot.

In some embodiments of the system, the first receiver and the second receiver are separated by a greatest distance possible on the mobile device.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 3A depicts a first of four geometric relationships between a stationary node and a mobile device across two sequential time instances in accordance with an embodiment of the present principles.

FIG. 3B depicts a second of four geometric relationships between a stationary node and a mobile device across two sequential time instances in accordance with an embodiment of the present principles.

FIG. 3C depicts a third of four geometric relationships between a stationary node and a mobile device across two sequential time instances in accordance with an embodiment of the present principles.

FIG. 3D depicts a fourth of four geometric relationships between a stationary node and a mobile device across two sequential time instances in accordance with an embodiment of the present principles.

FIG. 4 depicts a table of accuracy improvements for navigating a single mobile device using a pose estimation/navigation augmentation system in accordance with an embodiment of the present principles.

FIG. 5 depicts a table of accuracy improvements based on loop closure errors for navigating a single mobile device using a pose estimation/navigation augmentation system in accordance with an embodiment of the present principles.

FIG. 6 depicts a table of accuracy improvements, for navigating a single mobile device and an assistive robot using a pose estimation/navigation augmentation system in accordance with an embodiment of the present principles.

Figure 1:
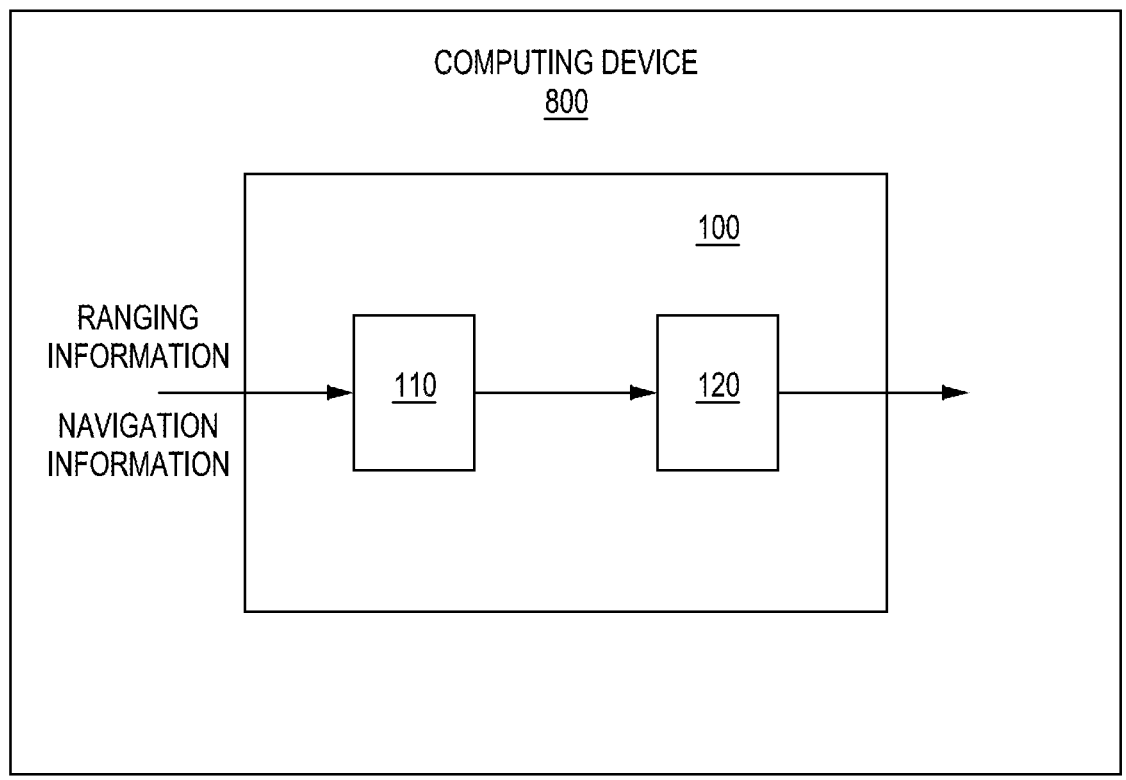
FIG. 1 depicts a high-level block diagram of a pose estimation/navigation augmentation system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for determining a change in pose of a mobile device using ranging nodes having unknown locations for, in some embodiments, augmenting navigation information. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to particular ranging nodes and receivers, such teachings should not be considered limiting. Embodiments in accordance with the present principles can function with substantially any ranging nodes and receivers for navigating in or mapping substantially any navigation environment using ranging beacons/nodes having unknown locations.

Embodiments of the present principles provide a novel approach to utilizing ranging information for determining a change in pose of a mobile device. It should be noted that as used herein, the term mobile device is used to represent any device capable of motion that can navigate a space, such as a robot platform, a computer being moved, a mobile phone being moved and even a person. In some embodiments, ranging beacons/nodes having unknown locations and ranging antennas, mounted on or carried by a mobile device, are implemented for determining a pose of a mobile device for augmenting navigation information for the mobile device. For example, in some embodiments, a mobile device carries a ranging radio at the platform center and includes at least two ranging antennas (A and B). At each time instance, the mobile device collects two ranging readings from at least one static UWB node (U). A first of the two readings represents the distance from U to A, and the other represents the distance from U to B.

Although in the explanation of some of the embodiments of the present principle, it is described that at each time instance, the antennas/receivers of the mobile device each collect a ranging reading from at least one static UWB node (U), in some embodiments of the preset principles each antenna/receiver requests a ranging reading from a static node within a specified short time period, for example 10 to 100 milliseconds, and in accordance with the present principles, the ranging readings are considered to have been received by each antenna/receiver within the same time instance.

Ranging readings received from a same static node, U, at two consecutive time instances are utilized to formulate a relative pose constraint, which indicates the change of the pose of the mobile device from previous time to current time. This formulation does not incorporate the location of the static node, which avoids conventional calibration for positions of static nodes. Embodiments of the present principles described herein can be implemented to improve the accuracy for any robot navigation system with or without onboard sensors.

That is, ranging information from static ranging nodes in accordance with the present principles can be used to determine a change in pose of a mobile device which can be used to improve an estimated accuracy of robot navigation systems without the need to know the locations of the static ranging nodes. The ranging-aided approach of the present principles formulates relative pose constraints using ranging readings based on geometric relationships between each remote, static ranging node and at least two ranging receivers on a mobile device, across time. Although in some embodiments the present principles are described with respect to the implementation of ultra-wideband technology radio signals for providing ranging information, in alternate embodiments of the present principles other radio signals, such as Bluetooth®, near-field technology radio signals, and substantially any radio signals capable of providing ranging information, can be implemented in accordance with the present principles. In addition, although some embodiments the present principles are described with respect to the implementation of radio signals for providing ranging information, in alternate embodiments, other devices and technology capable of providing ranging information, such as laser ranging technology, can be implemented to provide ranging information in accordance with the present principles.

FIG. 1 depicts a high-level block diagram of a pose estimation/navigation augmentation system 100 in accordance with an embodiment of the present principles. The pose estimation/navigation augmentation system 100 of FIG. 1 illustratively comprises a pose determination module 110 and a navigation integration module 120.

As further depicted in FIG. 1, embodiments of a pose estimation/navigation augmentation system 100 of the present principles, such as the pose estimation/navigation augmentation system 100 of FIG. 1, can be implemented via a computing device 800 in accordance with the present principles (described in greater detail below).

Figure 2:
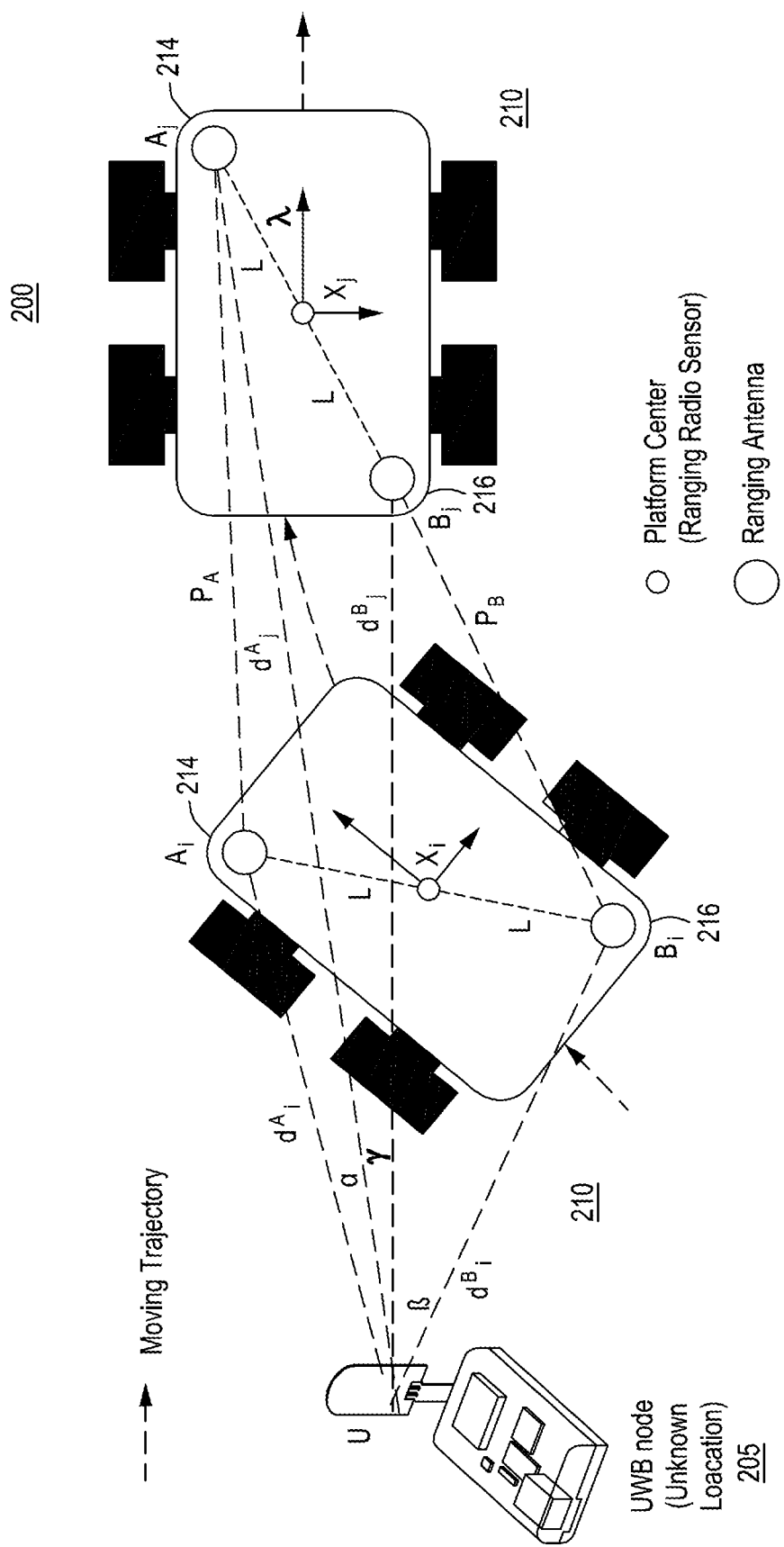
FIG. 2 depicts a navigation environment in which an embodiment of a pose estimation/navigation augmentation system of the present principles can be implemented in accordance with an embodiment of the present principles.

FIG. 2 depicts a navigation environment 200 in which an embodiment of a pose estimation/navigation augmentation system of the present principles, such as the pose estimation/navigation augmentation system 100, can be implemented. The navigation environment 200 of FIG. 2 illustratively comprises a static, ultra-wideband (UWB) node 205, and a robot platform (e.g., mobile device) 210. In the embodiment of the navigation environment 200 of FIG. 2, the robot platform 210 is equipped with a UWB ranging radio 212 (illustratively at the platform center) and with two UWB antennas A and B. As depicted in the embodiment FIG. 2, in some embodiments, a pose estimation/navigation augmentation system of the present principles, such as the pose estimation/navigation augmentation system 100 of FIG. 1 can be located on the robot platform 210. Alternatively or in addition, in some embodiments a pose estimation/navigation augmentation system of the present principles can comprise a stand alone controller/computing device located locally or remotely from the navigation environment as further described with reference to FIG. 9.

In the navigation environment 200 of FIG. 2, the ranging radio 212 at the robot platform 210 receives two ranging readings from the static UWB node 205. A first reading includes the distance from the static UWB node 205 to the first antenna A, and a second reading includes the distance from the static UWB node 205 to the second antenna B at time i and time j, respectively. In some embodiments, the ranging readings received from a same static node, such as the static UWB node 205 of FIG. 2, at two consecutive time instances and all other information received/determined by the ranging radio 212 can be communicated to, for example a pose determination module of the present principles, such as the pose determination module 110 of the pose estimation/navigation augmentation system 100 of FIG. 1. The information received by the pose determination module 110 can be utilized to formulate a relative pose constraint, which indicates the change of the robot's pose from a previous time to a current time. That is, the ranging information determined based on the configuration of the navigation environment 200 of FIG. 2 indicates the change of the robot platform's pose (2D position and 2D rotation) from time i to time j. The determined change in pose of the robot platform 210, determined in accordance with the present principles, can be used to improve an odometry estimation for any robot navigation system with on-board sensors. Although in the embodiment of the navigation environment 200 of FIG. 2 of the present principles, there is illustratively only one static UWB node 205 and one robot platform 210 comprising two UWB antennas, in alternate embodiments of the present principles, a navigation environment of the present principles can include more than one static UWB node, more than one robot platform, each comprising at least two or more UWB antennas.

As evident from the navigation environment 200 of FIG. 2, unlike previous methods for navigation augmentation systems, embodiments of the present principles for determining a change in pose of a mobile device using ranging beacons having unknown locations for augmenting navigation information does not require any prior knowledge about the locations of UWB nodes and/or radios during navigation. Some embodiments of the present principles are designed to form relative pose constraints from available ranging readings to improve the odometry estimation for any mobile navigation system with or without on-board sensors.

In some embodiments, the navigation pose of a mobile device (e.g., robot platform) at time i can be defined as $x_i = (R_i; t_i)$. Such a navigation pose can include 3D rotation, $R_i$, and 3D translation, $t_i = (t_i^x, t_i^y, t_i^z)$. It should be noted that the 3D rotation, $R_i$, represents the rotation from the local body's coordinate system to the global reference coordinate system, while the 3d translation, t, represents the 3D position of the local coordinate system's origin in the global reference coordinate system. To simplify the notation, the ranging radio sensor is assumed to be installed on the platform center, which is the origin of the body coordinate system.

Referring back to the navigation environment 200 in which an embodiment of a pose estimation/navigation augmentation system of the present principles can be implemented, in some embodiments, the two UWB antennas A, B can be installed on the robot platform 210 such that the two UWB antennas A, B are spaced as far apart as possible. For example, in some embodiments, the two UWB antennas A, B are installed along the diagonal line of the robot platform 210. The fixed angle between this diagonal line and the heading (moving) direction of the robot is represented as λ. The distance between these two antennas is represented as 2L (L being the distance between the platform center and one antenna). At a given time k={i, j}, the ranging radio 212 on the robot platform 210 receives two ranging readings from the static UWB node (U) 205 (distance $d_k^A$ from the static UWB node (U) 205 to the first antenna A, and distance $d_k^B$ from the static UWB node (U) 205 to the second antenna B).

In the embodiment of FIG. 2, α represents the angle subtended at the fixed node by the line joining two different positions of the first antenna, A. Likewise, β represents the angle subtended by the line joining two different positions of the second antenna, B. In the embodiment of FIG. 2, θ represents the angle subtended at the fixed node by the line joining antennas A and B at time step k=i and γ represents the angle subtended by the same line at time step k=j. In the embodiment of FIG. 2, $P_A$ and $P_B$ denote the moving distance (from time i to time j) of antenna A and antenna B, respectively. The formulation of FIG. 2 projects the 3D distance measurements into a 2D plane parallel to ground and hence all the above measurements ($d_k^A$, $d_k^B$, α, β, θ, γ) are represented in the 2D plane. For a mobile device, a 3D pose change within a short period of time (i.e., between time i and j) can be approximated by the above described 2D plane assumption.

A relationship between the four angles (α, β, θ, γ) depends on the relative pose of a mobile device with respect to the fixed node across two time instances. The relationship can be computed based on a geometry as depicted in FIGS. 3A-3D. That is, FIGS. 3A-3D depict four kinds of geometric relationships existing between the static UWB node 205 and the moving robot platform 210 across two sequential time instances (i, j). In FIGS. 3A-3D, the line segments $A_iA_j$, $A_jB_j$, $B_jB_i$ and $B_iA_i$ can either form a quadrilateral or a complex quadrilateral. The static UWB node U can either be located outside or inside the quadrilateral. For each case, the relationship between the angles can be characterized as follows:

(i) static UWB node, U, outside the quadrilateral $A_iA_jB_jB_i$ $c_1\theta + c_2\gamma + c_3\alpha + c_4\beta = 0, c_i \in \{-1,1\}$ (ii) static UWB node, U, inside the quadrilateral $A_iA_jB_jB_i$ $\theta + \gamma + \alpha + \beta = 2\pi$ (iii) static UWB node, U, outside the complex quadrilateral $A_iA_jB_jB_i$ $c_1\theta + c_2\gamma + c_3\alpha + c_4\beta = 0, c_i \in \{-1,1\}$ (iv) static UWB node, U, inside the complex quadrilateral $A_iA_jB_jB_i$ $$c\theta - c\gamma + \alpha + \beta = 2\pi \quad \text{(if } A_iA_j \text{ and } B_jB_i \text{ intersect)}$$

$$\theta + \gamma + c\alpha - c\beta = 2\pi \quad \text{(if } A_iB_i \text{ and } A_jB_j \text{ intersect)}$$

$$c \in \{-1, 1\}$$

The values of coefficients of the above relationship between the angles depend on the actual location of the static UWB node, U. Considering all possible combinations of coefficient values, the four above-described relationship between the angles jointly result in 13 different relationships between the angles. All 13 relationships can be characterized according to equations one (1) through four (4) as follows:

$$\cos(\theta - \gamma) = \cos(\alpha + \beta) \quad (1)$$

$$\cos(\theta - \gamma) = \cos(\alpha - \beta) \quad (2)$$

$$\cos(\theta + \gamma) = \cos(\alpha + \beta) \quad (3)$$

$$\cos(\theta + \gamma) = \cos(\alpha - \beta) \quad (4)$$

The four relationships between the angles ($\alpha$, $\beta$, $\theta$, $\gamma$) capture all possible configurations of a mobile device, such as the moving robot 210 of FIG. 2, and a static UWB node, such as the static UWB node 205 of FIG. 2, across at least two time instances. A main idea behind the technical approach of the present principles is to derive a special form of relative pose measurement that is independent to the location of a static UWB node, U, using ranging readings ($d_i^A$, $d_i^B$, $d_j^A$, $d_j^B$) based on geometric relationships between the static UWB node, U, and the moving robot across at least two time instances In some embodiments, a new measurement model in accordance with the present principles can be determined by the pose determination module 110. In some embodiments, the measurement model of present principles includes a $\cos(\theta-\gamma)$ function, which is the cosine function of the relative angle change between a static UWB node and the diagonal line, for example a diagonal line from A to B in FIG. 2, across time.

In some embodiments, a determination of the new measurement model can begin by using four cosine functions for the angles related to the ranging readings previously described in FIG. 3 and according to the following equations (5)-(8):

$$\cos(\theta) = \frac{(d_i^A)^2 + (d_i^B)^2 - 4L^2}{2 d_i^A d_i^B} \quad (5)$$

$$\cos(\gamma) = \frac{(d_j^A)^2 + (d_j^B)^2 - 4L^2}{2 d_j^A d_j^B} \quad (6)$$

$$\cos(\alpha) = \frac{(d_i^A)^2 + (d_j^A)^2 - (P_A)^2}{2 d_i^A d_j^A} \quad (7)$$

$$\cos(\beta) = \frac{(d_i^B)^2 + (d_j^B)^2 - (P_B)^2}{2 d_i^B d_j^B}. \quad (8)$$

The equations (5)-(8) provide a constraint on $P_A$ and $P_B$, which can be calculated based on the platform pose at time i given that the platform pose is known at time i. Note that at a given time k={i, j}, $t_k^x$ and $t_k^y$ represents the 2D global location for a mobile device, such as a robot platform, while $h_k$ indicates the summation of the global heading angle of the mobile device/robot platform and the fixed $\lambda$. Given that, the positions of both the antennas can be expressed in terms of the pose of the mobile device/robot platform at both time instances. Accordingly, $P_A$ and $P_B$ can be expressed in terms of the platform poses at time i and j can be characterized according to equations (9) and (10), which follow:

$$(P_A)^2 = (t_j^x - t_i^x)^2 + (t_j^y - t_i^y)^2 + 4L^2 \sin^2\left(\frac{h_j - h_i}{2}\right) + \quad (9)$$
$$2L\left[(t_j^x - t_i^x)(\cos(h_j) - \cos(h_i)) + (t_j^y - t_i^y)(\sin(h_j) - \sin(h_i))\right],$$

$$(P_B)^2 = (t_j^x - t_i^x)^2 + (t_j^y - t_i^y)^2 + 4L^2 \sin^2\left(\frac{h_j - h_i}{2}\right) - \quad (10)$$
$$2L\left[(t_j^x - t_i^x)(\cos(h_j) - \cos(h_i)) + (t_j^y - t_i^y)(\sin(h_j) - \sin(h_i))\right].$$

For all four kinds of relationships of angles as depicted in equations (1)-(4), it can be observed that LHS (left-hand side), which is either $\cos(\theta-\gamma)$ or $\cos(\theta+\gamma)$, is purely the function of measurement observations ($d_i^A$, $d_i^B$, $d_j^A$, $d_j^B$) as depicted in equations (5) and (6). RHS (right-hand side) for the four kinds of relationships of angles is the function of measurement observations and the platform pose at time i and j, which is independent of the location of a static node as depicted in equations (7) and (8). Consequently, one of these relationships always constraint the platform poses at any two time instances i and j without requiring knowledge of the location of a static node. In some embodiments, the inventors select LHS (left-hand side) relationships, which is either $\cos(\theta-\gamma)$ or ($\cos(\theta+\gamma)$, as a measurement model. The measurement models for all four configurations can then be formulated as the functions of navigation pose states $x_i$ and $x_j$ and the isotropic noise, w, according to equations (11)-(14), which follow:

$$z^a = m(x_i, x_j) + w = \cos(\theta - \gamma) + w = \cos(\alpha + \beta) + w, \quad (11)$$

$$z^b = m(x_i, x_j) + w = \cos(\theta - \gamma) + w = \cos(\alpha - \beta) + w, \quad (12)$$

$$z^c = m(x_i, x_j) + w = \cos(\theta + \gamma) + w = \cos(\alpha + \beta) + w, \quad (13)$$

$$z^d = m(x_i, x_j) + w = \cos(\theta + \gamma) + w = \cos(\alpha - \beta) + w, \quad (14)$$

where w is modeled as an isotropic noise.

The above models are linearized assuming that the measurement observations change linearly with a small change in the input poses. As a navigation pose is multivariate, the derivative is represented using Jacobians. The linearization model can be characterized according to equations (15)-(17), which follow:

$$\delta_z = J_i \delta x_i + J_j \delta x_j, \quad (15)$$

$$\delta x = [\delta roll \ \delta pitch \ \delta yaw \ \delta t^x \ \delta t^y \ \delta t^z]^T,$$

$$J_i = [0 \ 0 \ K_C \ K_A \ K_B \ 0], \quad (16)$$

$$J_j = [0 \ 0 \ K_F \ K_D \ K_E \ 0]. \quad (17)$$

After a series of algebraic calculations, in some embodiments the Jacobian can be derived as follows:

$$K_C = C_\alpha C_1 + C_\beta C_2, \ K_A = C_\alpha A_1 + C_\beta A_2,$$

-continued $$K_B = C_\alpha B_1 + C_\beta B_2, \; K_F = C_\alpha F_1 + C_\beta F_2,$$

$$K_D = C_\alpha D_1 + C_\beta D_2, \; K_E = C_\alpha E_1 + C_\beta E_2,$$

$$A_1 = -(\hat{t}_j^x - \hat{t}_i^x) - L(\cos(\hat{h}_j) - \cos(\hat{h}_i)),$$

$$B_1 = -(\hat{t}_j^y - \hat{t}_i^y) - L(\sin(\hat{h}_j) - \sin(\hat{h}_i)),$$

$$C_1 = L^2 \sin(\hat{h}_j - \hat{h}_i) + L[(\hat{t}_j^x - \hat{t}_i^x)\sin(\hat{h}_i) - (\hat{t}_j^y - \hat{t}_i^y)\cos(\hat{h}_i))],$$

$$D_1 = (\hat{t}_j^x - \hat{t}_i^x) + L(\cos(\hat{h}_j) - \cos(\hat{h}_i)),$$

$$E_1 = (\hat{t}_j^y - \hat{t}_i^y) + L(\sin(\hat{h}_j) - \sin(\hat{h}_i)),$$

$$F_1 = L^2 \sin(\hat{h}_j - \hat{h}_i) - L[(\hat{t}_j^x - \hat{t}_i^x)\sin(\hat{h}_i) - (\hat{t}_j^y - \hat{t}_i^y)\cos(\hat{h}_j))],$$

$$A_2 = -(\hat{t}_j^x - \hat{t}_i^x) + L(\cos(\hat{h}_j) - \cos(\hat{h}_i))$$

$$B_2 = -(\hat{t}_j^y - \hat{t}_i^y) + L(\sin(\hat{h}_j) - \sin(\hat{h}_i)),$$

$$C_2 = -L^2 \sin(\hat{h}_j - \hat{h}_i) - L[(\hat{t}_j^x - \hat{t}_i^x)\sin(\hat{h}_i) - (\hat{t}_j^y - \hat{t}_i^y)\cos(\hat{h}_i))],$$

$$D_2 = (\hat{t}_j^x - \hat{t}_i^x) - L(\cos(\hat{h}_j) - \cos(\hat{h}_i)),$$

$$E_1 = (\hat{t}_j^y - \hat{t}_i^y) + L(\sin(\hat{h}_j) - \sin(\hat{h}_i)),$$

$$F_2 = L^2 \sin(\hat{h}_j - \hat{h}_i) + L[(\hat{t}_j^x - \hat{t}_i^x)\sin(\hat{h}_j) - (\hat{t}_j^y - \hat{t}_i^y)\cos(\hat{h}_j))].$$

For $z^{(a,c)}$, $C_\alpha$ and $C_\beta$ can be calculated according to equations (18) and (19), which follow:

$$C_\alpha = \frac{-\sin(\alpha + \beta)}{d_i^A d_j^A \sin(\alpha)}, \quad (18)$$

$$C_\beta = \frac{-\sin(\alpha + \beta)}{d_i^B d_j^B \sin(\beta)}. \quad (19)$$

For $z^{(b,a)}$, $C_\alpha$ and $C_\beta$ can be calculated according to equations (20) and (21), which follow:

$$C_\alpha = \frac{-\sin(\alpha - \beta)}{d_i^A d_j^A \sin(\alpha)}, \quad (20)$$

$$C_\beta = \frac{-\sin(\alpha - \beta)}{d_i^B d_j^B \sin(\beta)}. \quad (21)$$

It should be noted that the Jacobians for all four models are the same, except the formulations for $C_\alpha$ and $C_\beta$ are different. The above analytical derivative calculation were selected instead of using automatic numerical solutions, because automatic numerical solutions are slower and often result in approximate solutions. It should be noted that for the ranging readings received at a specific time, the measurement formulation from one of $z^a$, $z^b$, $z^c$, $z^d$ is dynamically selected based on current geometric relationships between a stationary UWB node and a mobile device, such as a moving robot, across time instances. In some embodiments, the decision is taken based on the minimum of the errors ($e^a$, $e^b$, $e^c$, $e^d$) according to equations (22)-(25), which follow:

$$e^a = |\cos(\theta - \gamma) - \cos(\hat{\alpha} + \hat{\beta})|, \quad (22)$$

$$e^b = |\cos(\theta - \gamma) - \cos(\hat{\alpha} - \hat{\beta})|, \quad (23)$$

$$e^c = |\cos(\theta + \gamma) - \cos(\hat{\alpha} + \hat{\beta})|, \quad (24)$$

$$e^d = |\cos(\theta + \gamma) - \cos(\hat{\alpha} - \hat{\beta})|, \quad (25)$$

where, in some embodiments, $\hat{\alpha}$ and $\hat{\beta}$ can be computed using navigation states estimated from other on-board sensors of a mobile device, such as a moving robot. More specifically, a pose of the mobile device determined in accordance with the present principles, from the ranging measurements, in some embodiments in the form of the new measurement model described above, can be applied to navigation estimations determined by a mobile device by, in some embodiments a navigation integration module of the present principles, such as the navigation integration module 120 of the pose estimation/navigation augmentation system 100 of FIG. 1, to improve the accuracy for any robot navigation system with or without onboard sensors. In some embodiments of the present principles, the determined pose/change in pose measurements can be integrated with existing navigation measurements of a mobile device having navigation capabilities using inference frameworks, including, but not limited to Extending Kalman Filtering approaches for navigation pose estimation in real time.

In some embodiments of the present principles, a sensor fusion framework based on factor graphs can be implemented, which is capable of incorporating multiple sensors with different rates, latencies, and error characteristics. In some embodiments, a sliding window smoother is used as an underlying inference method over factor graphs, which supports full 3D simultaneous localization and mapping (SLAM) formulation while outputting real-time poses for robot navigation.

More specifically, embodiments of the present principles, in some instances in the form of a measurement model, provide a constraint between poses of a mobile device at two time instances. The constraint can be integrated into any existing navigation framework, for example, by a navigation integration module of the present principles, such as the navigation integration module 120 of the pose estimation/navigation augmentation system 100 of FIG. 1. For example, in a factor graph based navigation system, the problem of navigation is formulated as a graph where a node represents the state of the system at a particular time instance. The edges in the graph represent the constraints between various nodes. These constraints are formulated based on the output of various sensors. In integrating a measurement model of the present principles with factor graph based navigation architecture, the output constraint from the measurement model adds another edge in the graph. The graph can be continuously optimized over a sliding window across time to yield the improved estimation of the states in a navigation system.

Alternatively or in addition, Kalman filter based approaches work by a two-phase process, including a prediction phase and an update phase. The prediction phase predicts the next state of the system, based on motion sensors (such as IMU) or motion assumptions (such as constant velocity assumptions). The update phase combines the prediction with the available measurement data from other sensors (such as camera, lidar or ranging radios). A measurement model of the present principles can be integrated, for example by a navigation integration module of the present principles, such as the navigation integration module 120 of the pose estimation/navigation augmentation system 100 of FIG. 1, into the update step of Kalman filtering formulation for navigation systems.

In an experimental embodiment, a Husky® ground vehicle was implemented as the robot platform, which was equipped with a set of low-cost on-board sensors, specifically an Inertial Measurement Unit (IMU), EO stereo cameras, and wheel odometry sensors. The Husky® robot platform was outfitted with a UWB ranging radio and two antennas and configured to form relative 2D pose constraints from ranging readings in accordance with the present principles. Multiple UWB nodes were arbitrarily placed on the ground in an indoor environment to be navigated. The approach was evaluated with multiple scenarios, using UWB nodes placed at unknown locations in the indoor environment.

More specifically, a Husky® ground vehicle had an existing robot navigation system ported into its Nvidia® Xavier, which is able to fuse onboard sensor streams, such as EO tracking cameras and IMU, from a RealSense™ T265, and wheel odometry, to estimate navigation poses of the Husky® ground vehicle in real time. The robot navigation system also supports SLAM capabilities to map the environment during navigation, and to optimize navigation poses through loop closure constraints when the Husky® ground vehicle revisits the same place. In addition, a PulsON™ 440 UWB ranging radio with two ranging antennas was installed on the Husky® ground vehicle in accordance with the present principles. As described above, different scenarios were designed to demonstrate the improvements of a pose estimation/navigation augmentation system of the present principles, such as the pose estimation/navigation augmentation system 100 of FIG. 1, without any knowledge about the locations of static UWB nodes in a test environment. In addition, a set of surveyed points were marked (as ground truth) on the ground in the test environment. The positions of these marked points were measured using state-of-the-art indoor land surveying techniques from the civil engineering industry. In the experiment, a height of the Husky® ground vehicle was measured beforehand, to enable a computation of 3D navigation error using surveyed points on the ground. A height of the antennas of the Husky® ground vehicle was also measured to the ground, to enable formulation of a ranging-based measurement model in the 2D world.

Experiments were conducted inside a 20 meter by 20 meter room, which had 4 surveyed points (as ground truth) on the ground. Four (4) UWB ranging nodes were placed on the ground inside this room and the locations of these nodes were unknown and without any calibration. Five (5) scenarios were designed with different navigation paths along the four (4) surveyed points inside the room. The five (5) surveyed points included 4 L-shaped loops, 5 rectangle loops, 4 straight-line loops, 2 L-shaped loops, and 1 straight-line loop.

Each scenario was tested both with and without ranging information from the static UWB ranging nodes at the unknown locations. For each scenario, the Husky® ground vehicle was driven along the individual path (loops) and back to the starting point in the end. Therefore, the starting position is the same as the ending position, which is beneficial for use in evaluating the loop closure estimation error from the robot navigation system. Note for the final two scenarios, the mapping capability of the Husky® ground vehicle's navigation system was turned off. Therefore, for the final two scenarios, the experimental results are based on pure multi-view odometry estimation, without loop-closure optimization. The final two scenarios emulate challenging situations in which the system is not be able to obtain reliable loop-closure constraints along the path for correcting estimated poses.

For further comparison, the inventors also implement a traditional ranging-aided navigation method on top of the same 3D SLAM system with the same on-board sensors (IMU, camera, wheel odometry) used for testing on the same 5 scenarios described above. The major difference between embodiments of the methods of the present principles and traditional ranging-aided method is that the traditional ranging-aided method requires the mapping of the positions of the stationary/ranging nodes. Therefore, for each scenario, the traditional ranging-aided method first needs to drive around inside the space to map the positions of all stationary/ranging nodes. Once the positions of the ranging nodes are estimated, the robot was driven through the same paths as the experimental embodiments of the present principles. The traditional ranging-aided navigation method was therefore able to utilize ranging information from "known" locations to improve the navigation results.

FIG. 4 includes a Table depicting a navigation accuracy for the five (5) scenarios with the different navigation paths along the four (4) surveyed points inside the room to be navigated by comparing the navigation results of the Husky® ground vehicle's navigation system without incorporation ranging information to results of the Husky® ground vehicle's navigation system using the traditional ranging-aided method and by comparing the navigation results of the Husky® ground vehicle's navigation system without incorporation ranging information to results of the Husky® ground vehicle's navigation system using pose and ranging measurements of the present principles. In the Table of FIG. 4, the first row depicts a total true distance of each of the five (5) scenarios; the second row depicts an accuracy of the measurements of the Husky® ground vehicle without ranging measurements of the present principles; the third row depicts an accuracy of the measurements of the Husky® ground vehicle including ranging measurement of the traditional ranging-aided method, the fourth row depicts an accuracy improvement when the traditional ranging-aided method is applied to the measurement of the Husky® ground vehicle; the fifth row depicts an accuracy of the measurements of the Husky® ground vehicle including ranging measurements of the present principles; and the sixth row depicts an accuracy improvement when a ranging system of the present principles is applied to the measurement of the Husky ground vehicle. In the Table of FIG. 4, the two accuracy numbers in each cell represent a 2D RMS error (meter) and a 3D RMS error (meter).

FIG. 5 includes a Table depicting a navigation accuracy for the five (5) scenarios with the different navigation paths along the four (4) surveyed points inside the room to be navigated by comparing the navigation results of the Husky® ground vehicle's navigation system to the surveyed points as ground truth with and without ranging measurements of the present principles based on loop closure error. In the Table of FIG. 5, the first row depicts a total true distance of each of the five (5) scenarios; the second row depicts an accuracy of the measurements of the Husky® ground vehicle without ranging measurements of the present principles; the third row depicts an accuracy of the measurements of the Husky® ground vehicle including ranging measurement of the traditional ranging-aided method, the fourth row depicts an accuracy improvement when the traditional ranging-aided method is applied to the measurement of the Husky® ground vehicle; the fifth row depicts an accuracy of the measurements of the Husky® ground vehicle including ranging measurements of the present principles; and the sixth row depicts an accuracy improvement when a ranging system of the present principles is applied to the measurement of the Husky® ground vehicle. In the Table of FIG. 5, the two accuracy numbers in each cell represent a 2D loop closure error (meter) and a 3D loop closure error (meter).

It is apparent from the Tables of FIG. 4 and FIG. 5 that using the ranging measurements of a pose estimation/navigation augmentation system of the present principles improves the navigation accuracy of the Husky® ground vehicle for all the scenarios. The error reduction of the ranging measurements of a pose estimation/navigation augmentation system of the present principles can be at least partly attributed to the horizontal direction, since, in some embodiments, the ranging-based measurement model of the present principles aims to constrain the relative 2D pose change of the robot across time. The Tables of FIG. 4 and FIG. 5 list both 3D and 2D navigation accuracy, because 2D navigation accuracy is important for mobile device applications. As depicted in the Tables of FIG. 4 and FIG. 5, both 3D and 2D accuracy are improved using the ranging measurements of a pose estimation/navigation augmentation system of the present principles. The ranging measurement model of the present principle contributes to entire 3D pose estimation through 3D motion propagation from other on-board sensors. The ranging measurements of a pose estimation/navigation augmentation system of the present principles improves 2D navigation accuracy by 40% ~65% and 3D navigation accuracy by 10% ~70% as depicted in the Table of FIG. 4, comparing to the results without ranging information.

As further depicted in the Tables of FIG. 4 and FIG. 5, the ranging measurements of a pose estimation/navigation augmentation system of the present principles improves the performance over traditional ranging-based methods. Moreover, one of the biggest advantages of the ranging measurements of a pose estimation/navigation augmentation system of the present principles over traditional ranging-based methods is that a pose estimation/navigation augmentation system of the present principles provide a more flexible and suitable solution to time-pressing applications or dynamic cluttered environments, because a pose estimation/navigation augmentation system of the present principles does not need to have knowledge of or calibrate the positions of the static ranging nodes.

In another experiment, an assistive robot having only a ranging radio, and no other sensors, was moved along with the Husky® ground vehicle of the previously described experiment. The assistive robot was driven along with the Husky® ground vehicle through stop-and-go moving patterns in turns. For example, the assistive robot was stationary when the Husky® vehicle was moving and the Husky® vehicle was stopped when the assistive robot was in motion. In the second experiment, the Husky® vehicle only used ranging readings from the assistive robot when the assistive robot was stationary. Because the Husky® vehicle only used ranging readings from the assistive robot when the assistive robot was stationary, the stationary assistive robot represents a different embodiment of a static node of the present principles.

The collaborative example including the assistive robot and the Husky® ground vehicle was tested using two scenarios. For each scenario, the Husky® ground vehicle was driven over 13 surveyed points (ground truth) for evaluation. The first scenario includes driving along a long featureless hallway (~50 meters), moving into an office-like environment (~ 25 meters by ~ 15 meters), doing a large loop and then a small loop, and then driving back along the hallway to the starting point. In the first scenario, there are no reliable loop closure constraints due to different moving directions of the mobile vehicles when revisiting the same places. Therefore, a navigation performance from the first scenario is based on pure multi-view odometry estimation without loop-closure optimization.

In the second scenario, the mobile devices (the assistive robot and the Husky® ground vehicle) were driven to repeat a large rectangle loop (~ 35 meters by ~15 meters) along the same direction twice. In the second scenario, the mobile devices obtain sufficient loop closure information for a SLAM optimization to correct the estimated poses in real time.

FIG. 6 includes a Table depicting a navigation accuracy for the above described two (2) scenarios of the second experiment having the different navigation paths, with and without ranging measurements of the present principles and with and without loop closure. In the Table of FIG. 6, the first row depicts a total true distance of each of the two (2) scenarios; the second row depicts an accuracy of the measurements of the Husky® ground vehicle without ranging measurements of the present principles; the third row depicts an accuracy of the measurements of the Husky® ground vehicle including ranging measurements of the present principles; and the fourth row depicts an accuracy improvement when a ranging system of the present principles is applied to the measurement of the Husky® ground vehicle. In the Table of FIG. 6, the two groups of two accuracy numbers in each cell represent a 2D RMS error (meter) and a 3D RMS error (meter) and a 2D loop closure error (meter) and a 3D loop closure error (meter).

As evident from the results listed in the Table of FIG. 6, the ranging measurements of a pose estimation/navigation augmentation system of the present principles substantially improves the navigation accuracy for both scenarios. Specifically, as depicted in the Table of FIG. 6, the ranging measurements in accordance with the present principles increases by 78.49%, 2D navigation accuracy in Scenario 1, that cannot leverage loop-closure optimization for navigation in challenging environment. The result indicates that utilizing ranging information in accordance with the present principles, assists in navigation estimation for mobile devices. It should again be noted that the ranging information/measurements to be used for the determination of a pose/change in pose of a mobile device, which can be used to improve navigation accuracy of a mobile device having navigation capabilities in accordance with the present principles, does not require a position estimation of a static ranging node used to provide the ranging information.

Embodiments of the present principles can be extended to improve the full 3D pose including location and orientation. For example, in some embodiments, a third receiver is added to a mobile device, such as a robot, such that each pair of the receivers lies in a plane perpendicular to the planes of other pairs. In such embodiments, there exists a pair of receivers in x-y, y-z and x-z planes of the robot coordinate system. Applying a same measurement model for each of these pairs of receivers in accordance with the present principles, the full 3D pose of the robot is constrained across at least two time-instances.

In some embodiments, during a first step, all measurements are projected in the x-y plane and an improved 2D position and heading angle estimates are determined. Subsequently, the improved 2D position and in-plane heading angle from the first step can be used to project all the measurements in y-z and x-z planes. Applying a same model of the present principles to both these planes enables a determination of improved z position, as well as pitch and roll angles of the robot.

Embodiments of the present principles can also be extended to more than just two time-instances. For example, in some embodiments a signal from a stationary node is received by at least two receivers of a mobile device at more than two time instances. In such embodiments, pose changes of a mobile device can be determined over more that two time instances and can even be determined in a continuous manner.

Figure 7:
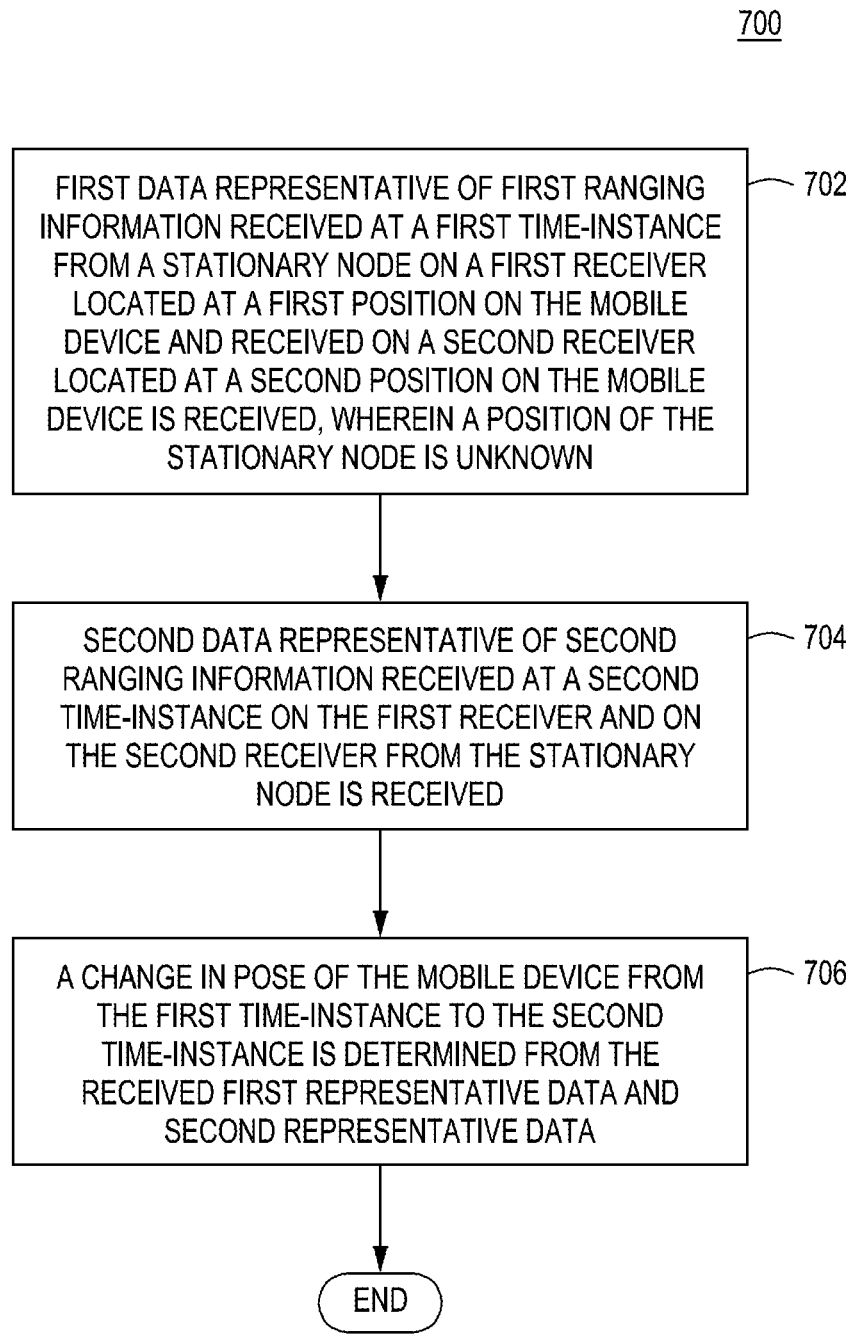
FIG. 7 depicts a flow diagram of a method for determining a change in pose of a mobile device in an environment to be navigated.

FIG. 7 depicts a flow diagram of a method 700 for determining a change in pose of a mobile device in an environment to be navigated, which can be used to augment navigation information in accordance with an embodiment of the present principles. The method 700 can begin at 702 during which first data representative of first ranging information received at a first time instance on a first receiver located at a first position on the mobile device and on a second receiver located at a second position on the mobile device from a stationary node is received, wherein a position of the stationary node is unknown. The method 700 can proceed to 704.

At 704, second data representative of second ranging information received at a second time instance on the first receiver and on the second receiver from the stationary node is received. The method 700 can proceed to 706.

At 706, a change in pose of the mobile device from the first time instance to the second time instance is determined from the received first representative data and second representative data. The method 700 can be exited.

In some embodiments, the method can further include implementing the determined change in pose of the mobile device to navigate the mobile device through the environment to be navigated As depicted in FIG. 1, embodiments of a pose estimation/navigation augmentation system of the present principles, such as the pose estimation/navigation augmentation system 100 of FIG. 1, can be implemented in a computing device 800 in accordance with the present principles. That is, in some embodiments, range reading data and the like can be communicated to components of the pose estimation/navigation augmentation system 100 of FIG. 1 using the computing device 800 via, for example, any input/output means associated with the computing device 800. Data associated with a pose estimation/navigation augmentation system in accordance with the present principles can be presented to a user using an output device of the computing device 800, such as a display, a printer or any other form of output device.

Figure 8:
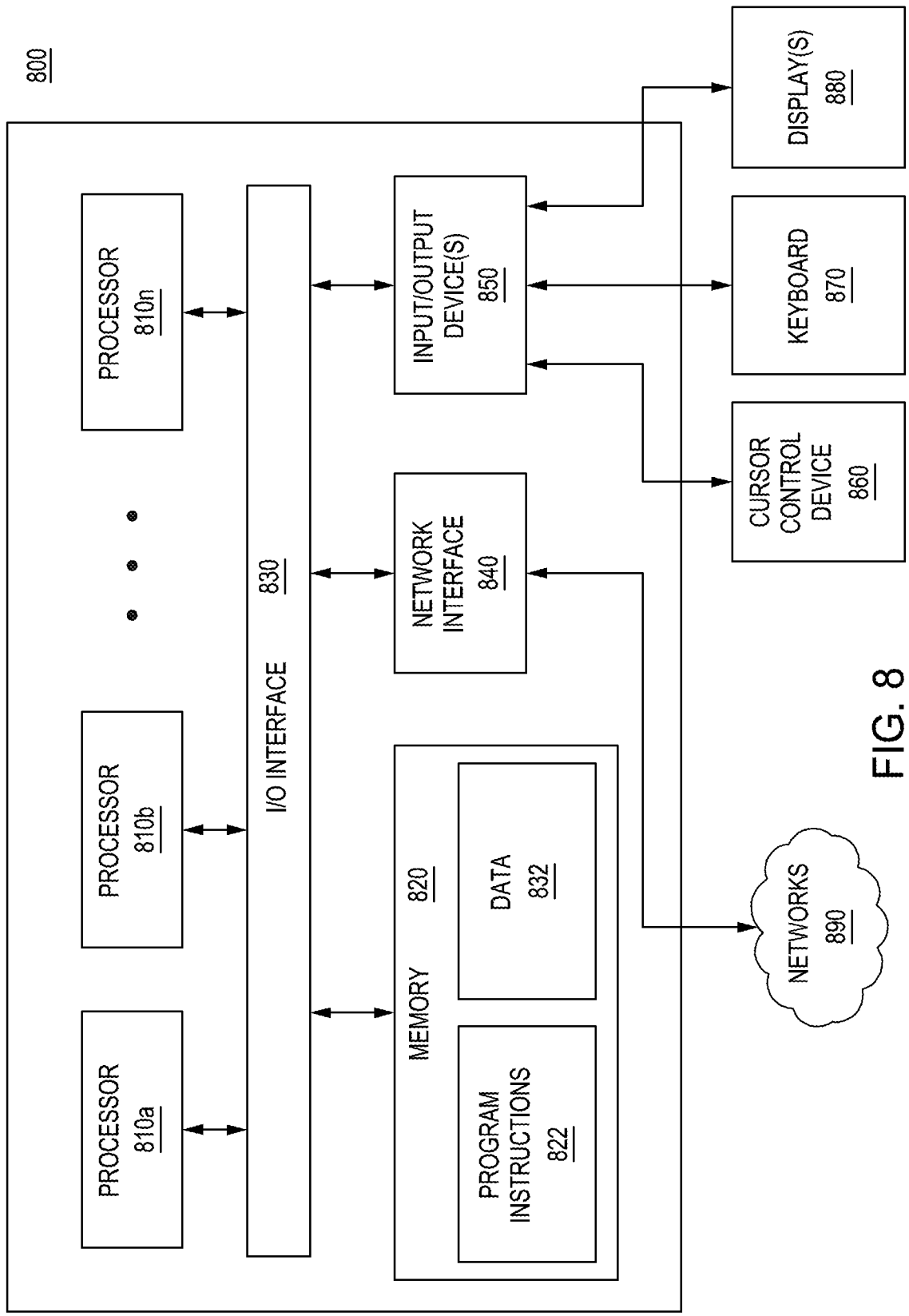
FIG. 8 depicts a high-level block diagram of a computing device suitable for use with embodiments of a content comprehension and response system in accordance with the present principles.

For example, FIG. 8 depicts a high-level block diagram of a computing device 800 suitable for use with embodiments of a pose estimation/navigation augmentation system in accordance with the present principles such as the navigation augmentation system 100 of FIG. 1. In some embodiments, the computing device 800 can be configured to implement methods of the present principles as processor-executable executable program instructions 822 (e.g., program instructions executable by processor(s) 810) in various embodiments.

In the embodiment of FIG. 8, the computing device 800 includes one or more processors 810a-810n coupled to a system memory 820 via an input/output (I/O) interface 830. The computing device 800 further includes a network interface 840 coupled to I/O interface 830, and one or more input/output devices 850, such as cursor control device 860, keyboard 870, and display(s) 880. In various embodiments, a user interface can be generated and displayed on display 880. In some cases, it is contemplated that embodiments can be implemented using a single instance of computing device 800, while in other embodiments multiple such systems, or multiple nodes making up the computing device 800, can be configured to host different portions or instances of various embodiments. For example, in one embodiment some elements can be implemented via one or more nodes of the computing device 800 that are distinct from those nodes implementing other elements. In another example, multiple nodes may implement the computing device 800 in a distributed manner.

In different embodiments, the computing device 800 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 800 can be a uniprocessor system including one processor 810, or a multiprocessor system including several processors 810 (e.g., two, four, eight, or another suitable number). Processors 810 can be any suitable processor capable of executing instructions. For example, in various embodiments processors 810 may be general-purpose or embedded processors implementing any of a variety of instruction set architectures (ISAs). In multiprocessor systems, each of processors 810 may commonly, but not necessarily, implement the same ISA.

System memory 820 can be configured to store program instructions 822 and/or data 832 accessible by processor 810. In various embodiments, system memory 820 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 820. In other embodiments, program instructions and/or data can be received, sent or stored upon different types of computer-accessible media or on similar media separate from system memory 620 or computing device 800.

In one embodiment, I/O interface 830 can be configured to coordinate I/O traffic between processor 810, system memory 820, and any peripheral devices in the device, including network interface 840 or other peripheral interfaces, such as input/output devices 850. In some embodiments, I/O interface 830 can perform any necessary protocol, timing or other data transformations to convert data signals from one component (e.g., system memory 820) into a format suitable for use by another component (e.g., processor 810). In some embodiments, I/O interface 830 can include support for devices attached through various types of peripheral buses, such as a variant of the Peripheral Component Interconnect (PCI) bus standard or the Universal Serial Bus (USB) standard, for example. In some embodiments, the function of I/O interface 830 can be split into two or more separate components, such as a north bridge and a south bridge, for example. Also, in some embodiments some or all of the functionality of I/O interface 830, such as an interface to system memory 820, can be incorporated directly into processor 810.

Network interface 840 can be configured to allow data to be exchanged between the computing device 800 and other devices attached to a network (e.g., network 890), such as one or more external systems or between nodes of the computing device 800. In various embodiments, network 890 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 850 can, in some embodiments, include one or more display terminals, keyboards, keypads, touchpads, scanning devices, voice or optical recognition devices, or any other devices suitable for entering or accessing data by one or more computer systems. Multiple input/output devices 850 can be present in computer system or can be distributed on various nodes of the computing device 800. In some embodiments, similar input/output devices can be separate from the computing device 800 and can interact with one or more nodes of the computing device 800 through a wired or wireless connection, such as over network interface 840.

Those skilled in the art will appreciate that the computing device 800 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 800 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 800 can communicate with other computing devices based on various computer communication protocols such a Wi-Fi, Bluetooth®.RTM. (and/or other standards for exchanging data over short distances includes protocols using short-wavelength radio transmissions), USB, Ethernet, cellular, an ultrasonic local area communication protocol, etc. The computing device 600 can further include a web browser.

Although the computing device 800 is depicted as a general purpose computer, the computing device 800 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 9:
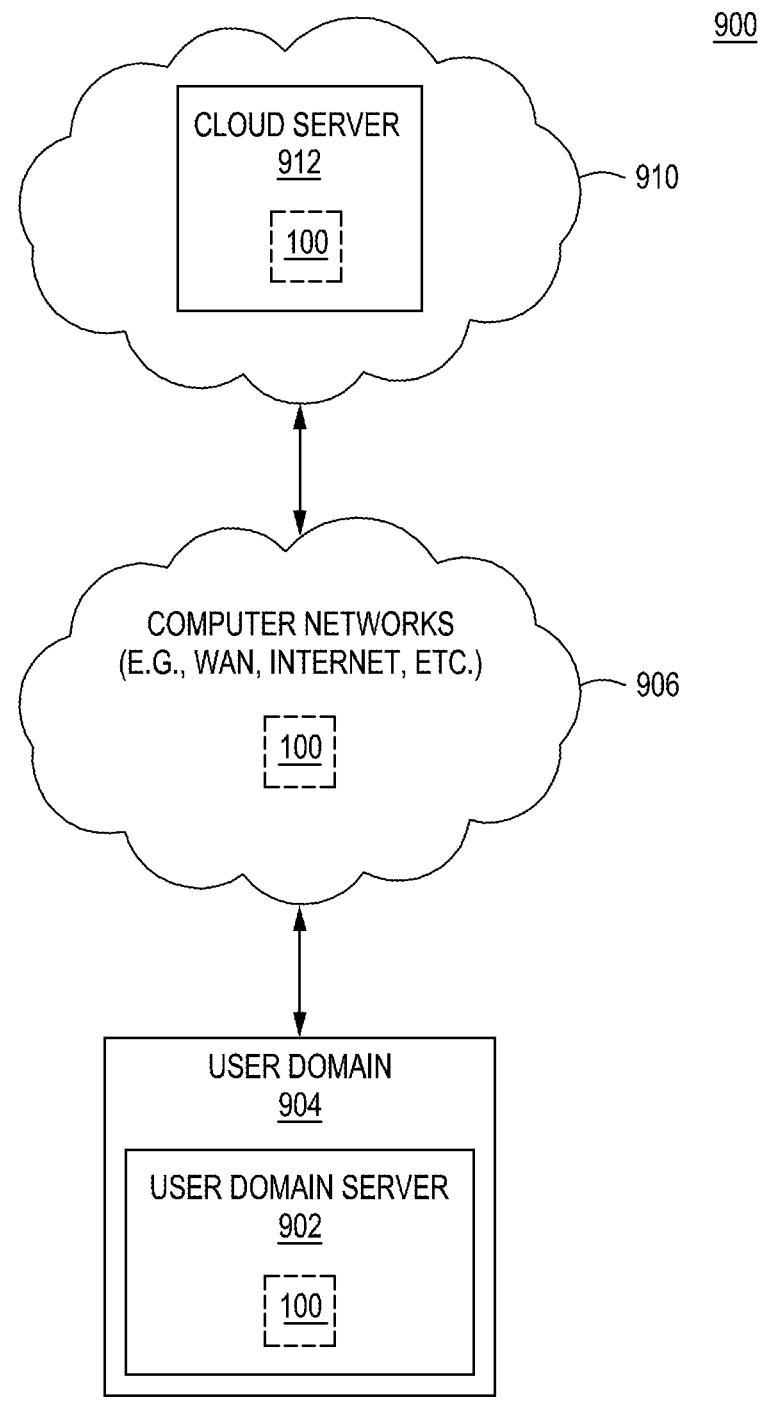
FIG. 9 depicts a high-level block diagram of a network in which embodiments of a content comprehension and response system in accordance with the present principles, can be applied.

FIG. 9 depicts a high-level block diagram of a network in which embodiments of a pose estimation/navigation augmentation system in accordance with the present principles, such as the pose estimation/navigation augmentation system 100 of FIG. 1, can be applied. The network environment 900 of FIG. 9 illustratively comprises a user domain 902 including a user domain server/computing device 904. The network environment 900 of FIG. 9 further comprises computer networks 906, and a cloud environment 910 including a cloud server/computing device 912.

In the network environment 900 of FIG. 9, a system for pose estimation/navigation augmentation in accordance with the present principles, such as the pose estimation/navigation augmentation system 100 of FIG. 1, can be included in at least one of the user domain server/computing device 904, the computer networks 906, and the cloud server/computing device 912. That is, in some embodiments, a user can use a local server/computing device (e.g., the user domain server/computing device 904) to provide a determination of a change in pose of a mobile device, which can be used for navigation augmentation of a mobile device in accordance with the present principles.

In some embodiments, a user can implement a system for navigation augmentation in the computer networks 906 to provide a change in pose of a mobile device, which can be used for navigation augmentation of a mobile device in accordance with the present principles. Alternatively or in addition, in some embodiments, a user can implement a system for navigation augmentation in the cloud server/computing device 912 of the cloud environment 910 to provide a change in pose of a mobile device, which can be used for navigation augmentation of a mobile device in accordance with the present principles. For example, in some embodiments it can be advantageous to perform processing functions of the present principles in the cloud environment 910 to take advantage of the processing capabilities and storage capabilities of the cloud environment 910. In some embodiments in accordance with the present principles, a system for navigation augmentation in accordance with the present principles can be located in a single and/or multiple locations/servers/computers to perform all or portions of the herein described functionalities of a system in accordance with the present principles. For example, in some embodiments some components of a pose estimation/navigation augmentation system of the present principles can be located in one or more than one of the a user domain 902, the computer network environment 906, and the cloud environment 910 while other components of the present principles can be located in at least one of the user domain 902, the computer network environment 906, and the cloud environment 910 for providing the functions described above either locally or remotely.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 800 can be transmitted to the computing device 800 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for determining a change in pose of a mobile device, comprising:
   receiving, from a stationary node, a first ranging signal at a first receiver located at a first position on the mobile device and at a second receiver located at a second position on the mobile device during a first time instance, wherein a position of the stationary node is unknown;
   receiving, from the stationary node, a second ranging signal at the first receiver and at the second receiver during a second time instance; and
   determining, from the first ranging signal and the second ranging signal, a change in pose of the mobile device from the first time instance to the second time instance.

2. The method of claim 1, wherein the first and the second ranging signals comprise at least one of laser ranging signals and radio ranging signals including at least one of ultra-wideband ranging signals, short-range, wireless ranging signals and near-field ranging signals.

3. The method of claim 1, further comprising implementing the determined change in pose of the mobile device to assist in a navigation of the mobile device through an environment to be navigated.

4. The method of claim 1, wherein determining a change in pose of the mobile device comprises:
   determining a distance from the stationary node to the first receiver and to the second receiver during the first time instance using the first ranging signal;
   determining a distance from the stationary node to the first receiver and to the second receiver during the second time instance using the second ranging signal; and
   determining how far and in which direction the first receiver and the second receiver moved between the first time instance and the second time instance to determine a change in pose of the mobile device from the first time instance to the second time instance.

5. The method of claim 1, wherein:
the first ranging signal is received at the first time instance on at least a third receiver located on at least a third position on the mobile device from the stationary node; and
the second ranging signal is received at the second time instance on the at least third receiver from the stationary node.

6. The method of claim 5, wherein the first ranging signal and the second ranging signal received on at least one of the first receiver, the second receiver and the at least third receiver are implemented to determine a three-dimensional change in pose of the mobile device from the first time instance to the second time instance.

7. The method of claim 1, further comprising:
receiving, from the stationary node, at least a third ranging signal received at the first receiver and the second receiver during at least a third time instance; and
wherein the determining a change in pose comprises, determining, from the first ranging signal, the second ranging signal, and the at least third ranging signal a change in pose of the mobile device between at least two of the first time instance, the second time instance and the third time instance.

8. A non-transitory machine-readable medium having stored thereon at least one program, the at least one program including instructions which, when executed by a processor, cause the processor to perform a method in a processor based system for determining a change in pose of a mobile device, comprising:
determining from a first ranging signal received at a first receiver located at a first position on the mobile device and received at a second receiver located at a second position on the mobile device from a stationary node during a first time instance, a distance from the stationary node to the first receiver and to the second receiver during the first time instance, wherein a position of the stationary node is unknown;
determining from a received second ranging signal received at the first receiver and at the second receiver from the stationary node during a second time instance a distance from the stationary node to the first receiver and to the second receiver during the second time instance; and
determining from information regarding the determined distance from the stationary node to the first receiver and to the second receiver during the first time instance and information regarding the determined distance from the stationary node to the first receiver and to the second receiver during the second time instance how far and in which direction the first receiver and the second receiver moved between the first time instance and the second time instance to determine a change in pose of the mobile device from the first time instance to the second time instance.

9. The non-transitory machine-readable medium of claim 8, wherein the method further comprises implementing the determined change in pose of the mobile device to assist in a navigation of the mobile device through an environment to be navigated.

10. The non-transitory machine-readable medium of claim 8, wherein:
the first ranging signal is received at the first time instance on at least a third receiver located on at least a third position on the mobile device from the stationary node; and
the second ranging signal is received at the second time instance on the at least third receiver from the stationary node.

11. The non-transitory machine-readable medium of claim 10, wherein the first ranging signal and the second ranging signal received on at least one of the first receiver, the second receiver and the at least third receiver are implemented to determine a three-dimensional change in pose of the mobile device from the first time instance to the second time instance.

12. The non-transitory machine-readable medium of claim 8, wherein the method further comprises;
receiving at least a third ranging signal received during at least a third time instance on the first receiver and on the second receiver from the stationary node; and
wherein the determining comprises, determining, from the first ranging signal, the second ranging signal, and the at least third ranging signal, a change in pose of the mobile device.

13. The non-transitory machine-readable medium of claim 8, wherein at least one of the first receiver and the second receiver comprises a radio antenna, the stationary node comprises a radio ranging node, and the mobile device comprises a robot.

14. A system for determining a change in pose of a mobile device, comprising:
a stationary node transmitting ranging signals during at least two time instances, wherein a position of the stationary node in the environment to be navigated is unknown;
the mobile device, comprising;
at least two receivers located at different locations on the mobile device receiving the ranging signals from the stationary node during the at least two time instances;
and
a computing device comprising a processor and a memory having stored therein at least one program, the at least one program including instructions which, when executed by the processor, cause the processor to perform a method for determining a change in pose of a mobile device in an environment to be navigated, comprising:
receiving, from the stationary node, a first ranging signal at a first receiver of the at least two receivers located at a first position on the mobile device and at a second receiver of the at least two receivers located at a second position on the mobile device during a first time instance of the at least two time instances, wherein a position of the stationary node is unknown;
receiving, from the stationary node, a second ranging signal at the first receiver and at the second receiver during a second time instance of the at least two time instances; and
determining, from the first ranging signal and the second ranging signal, a change in pose of the mobile device from the first time instance to the second time instance.

15. The system of claim 14, wherein the mobile device further comprises at least position sensors for determining information for navigation of the mobile device through an environment to be navigated and the method further comprises implementing the determined change in pose of the mobile device to assist in the navigation of the mobile device through the environment to be navigated.

16. The system of claim 14, wherein determining a change in pose of the mobile device comprises:

determining a distance from the stationary node to the first receiver and to the second receiver at the first time instance using the first ranging signal;

determining a distance from the stationary node to the first receiver and to the second receiver at the second time instance using the second ranging signal; and determining how far and in which direction the first receiver and the second receiver moved between the first time instance and the second time instance to determine a change in pose of the mobile device from the first time instance to the second time instance.

17. The system of claim 14, wherein:

the first radio signal, from the stationary node, received at the first time instance is further received on at least one third receiver located on at least a third position on the mobile device; and the second ranging signal, from the stationary node, received at the second time instance is further received on the at least third receiver from the stationary node.

18. The system of claim 17, wherein the first ranging signal and the second ranging signal received on at least one of the first receiver, the second receiver and the at least third receiver are implemented to determine a three-dimensional change in pose of the mobile device from the first time instance to the second time instance.

19. The system of claim 17, wherein the at least third receiver is located on a different plane than the first receiver and the second receiver.

20. The system of claim 19, wherein the at least third receiver is implemented to determine a three-dimensional change in pose of the mobile device from the first time instance to the second time instance.

21. The system of claim 14, wherein the method further comprises;

receiving a third radio signal received on at least a third time instance on the first receiver and on the second receiver from the stationary node; and wherein the determining a change in pose of the mobile device comprises determining, from the first ranging signal, the second ranging signal, and the at least third ranging signal, a change in pose of the mobile device.

22. The system of claim 14, wherein at least one of the first receiver and the second receiver comprises a radio antenna, the stationary node comprises a ranging radio node, and the mobile device comprises a robot.

23. The system of claim 14, wherein the first receiver and the second receiver are separated by a greatest distance possible on the mobile device.

* * * * *